United States Patent
Yamada

(10) Patent No.: US 8,234,027 B2
(45) Date of Patent: Jul. 31, 2012

(54) CHARGE-DISCHARGE MANAGEMENT APPARATUS AND COMPUTER READABLE MEDIUM HAVING INSTRUCTIONS FOR ACHIEVING THE APPARATUS

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 1078 days.

(21) Appl. No.: 12/214,379

(22) Filed: Jun. 18, 2008

(65) Prior Publication Data

US 2008/0319597 A1 Dec. 25, 2008

(30) Foreign Application Priority Data

Jun. 20, 2007 (JP) ................................. 2007-162506

(51) Int. Cl.
B60L 9/00 (2006.01)
(52) U.S. Cl. ........................................................ 701/22
(58) Field of Classification Search ........................ None
See application file for complete search history.

(56) References Cited

U.S. PATENT DOCUMENTS

| | | | |
|---|---|---|---|
| 6,314,347 B1 | 11/2001 | Kuroda et al. | |
| 7,958,958 B2 * | 6/2011 | de la Torre Bueno | 180/65.29 |
| 2003/0015358 A1 * | 1/2003 | Abe et al. | 180/65.3 |
| 2003/0045999 A1 * | 3/2003 | Joerg et al. | 701/209 |
| 2004/0029677 A1 * | 2/2004 | Mori et al. | 477/3 |
| 2006/0232277 A1 * | 10/2006 | Murakami et al. | 324/433 |
| 2007/0005235 A1 | 1/2007 | Suzuki et al. | |
| 2007/0139015 A1 * | 6/2007 | Seo et al. | 320/132 |
| 2007/0294026 A1 * | 12/2007 | Schirmer | 701/202 |
| 2008/0054848 A1 * | 3/2008 | Yun et al. | 320/134 |
| 2010/0063720 A1 * | 3/2010 | Machino | 701/201 |

FOREIGN PATENT DOCUMENTS

| | | |
|---|---|---|
| JP | 2000-333305 | 11/2000 |
| JP | 2001-183150 | 7/2001 |
| JP | 2004-101245 | 4/2004 |
| JP | 2004-248455 | 9/2004 |
| JP | 2007-010572 | 1/2007 |
| JP | 2007-050888 | 3/2007 |

OTHER PUBLICATIONS

U.S. Appl. No. 12/214,378, filed Jun. 18, 2008, Yamada.

* cited by examiner

Primary Examiner — Thomas Tarcza
Assistant Examiner — Nagi Murshed
(74) Attorney, Agent, or Firm — Harness, Dickey & Pierce, PLC

(57) ABSTRACT

In charge-discharge control for a battery in a hybrid vehicle, when a difference between a target SOC (State Of Charge) and a present SOC becomes greater than or equal to a reference range in an estimated route to a destination, a charge schedule is drawn up again as a charge re-schedule. However, if the number of times of the re-schedule becomes greater than or equal to predetermined N times or if a remaining distance to the destination becomes less than a predetermined reference distance, a hybrid control based on the charge schedule is stopped without the charge re-schedule drawn up.

12 Claims, 6 Drawing Sheets

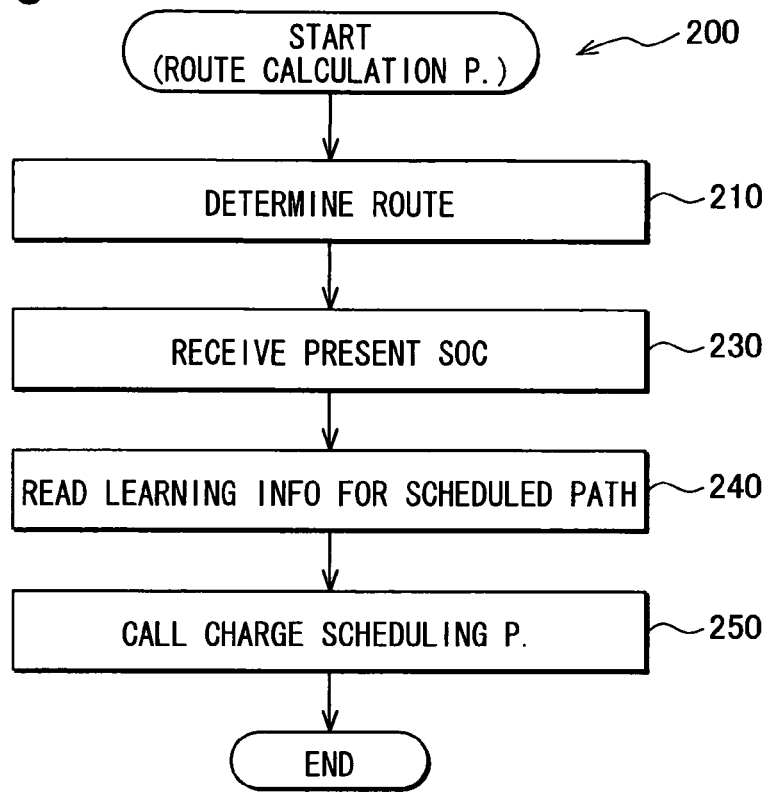
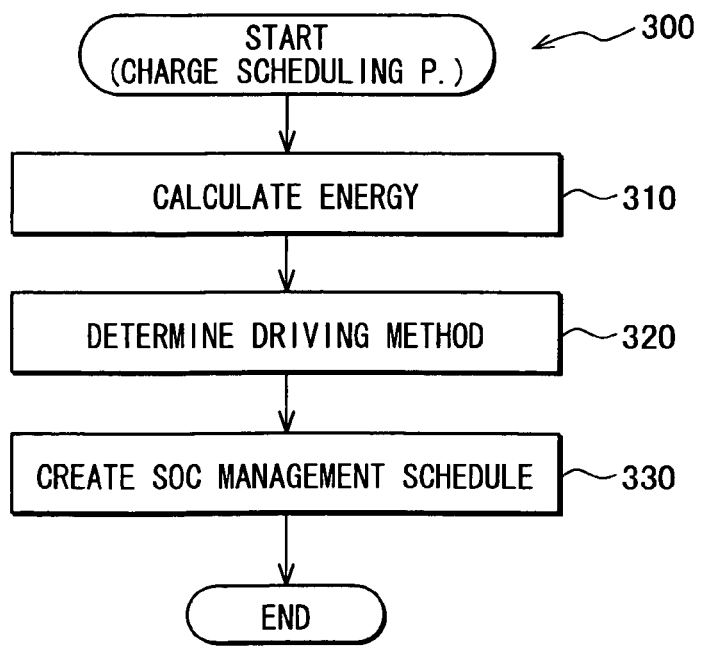

CHARGE-DISCHARGE MANAGEMENT APPARATUS AND COMPUTER READABLE MEDIUM HAVING INSTRUCTIONS FOR ACHIEVING THE APPARATUS

CROSS REFERENCE TO RELATED APPLICATION

This application is based on and incorporates herein by reference Japanese Patent Application No. 2007-162506 filed on Jun. 20, 2007.

FIELD OF THE INVENTION

The present invention relates to a charge-discharge management apparatus for a battery of a hybrid vehicle, and a computer readable medium having instructions for achieving the charge-discharge management apparatus.

BACKGROUND OF THE INVENTION

There has been provided a hybrid vehicle using as a power source for running (i) an internal combustion engine driven by fuel combustion and (ii) a motor driven by a battery. As disclosed in Patent Documents 1 to 3, for example, a charge-discharge management apparatus is known so as to save fuel consumed by the internal combustion engine of the hybrid vehicle. The charge-discharge management apparatus creates a schedule concerning whether or not to operate the internal combustion engine and the motor and charge the battery along an estimated route. The charge-discharge management apparatus allows a hybrid vehicle control apparatus to provide control in accordance with the schedule.

Road congestion situation or driving situation such as a vehicle speed continuously changes. Thus, it may be difficult to keep the remaining quantity of the battery according to transition of the remaining quantity estimated or predicted based on the schedule while actually running the estimated route. In Patent document 3, in order to address the above difficulty, when transition of SOC (State Of Charge) predicted from the schedule and transition of actual SOC come to be differentiated from each other, the schedule is re-calculated.

Patent Document 1: JP 2000-333305 A (U.S. Pat. No. 6,314, 347)
Patent Document 2: JP 2001-183150 A
Patent Document 3: JP 2007-50888 A From the study of the inventor, the reliability of the schedule is not so perfect (i.e., not 100%) so that re-calculating of the schedule or re-scheduling is not always more useful than not re-calculating. For example, there is a technology to re-calculate the schedule according to the difference between the above predicted SOC and an actual SOC. If such a technology is adopted and repeated, it may result in worsening fuel consumption in comparison with the case where re-calculating the schedule is never made.

SUMMARY OF THE INVENTION

The present invention has been made in consideration of the foregoing. It is therefore an object of the present invention to provide a technology to stop a control, which is provided in accordance with a schedule created by a charge-discharge management apparatus concerning whether or not to operate the internal combustion engine and the motor and to charge the battery. The control is stopped when there is a possibility that the control according to the schedule may worsen fuel consumption.

According to a first aspect of the present invention, a charge-discharge management apparatus is provided as follows for a battery of a hybrid vehicle, which uses an internal combustion engine driven by fuel combustion and a motor driven by the battery as a power source for running. A scheduling control unit is configured to (i) determine a schedule about whether or not to drive the hybrid vehicle using the motor and to charge the battery along an estimated route to a destination and (ii) estimate transition of a remaining quantity of the battery along the estimated route based on the schedule. A scheduled running control unit is configured, when the hybrid vehicle runs along the estimated route, to perform a control over whether or not to drive the hybrid vehicle using the motor and whether or not to charge the battery in accordance with the schedule. A re-scheduling control unit is configured to operate to cause the scheduling control unit to operate again when the hybrid vehicle runs along the estimated route, based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position. A stop control unit is configured to stop an operation of the scheduled running control unit based on the re-scheduling control unit having operated a number of times greater than or equal to a reference times value while the hybrid vehicle travels from a start point to the present position along the estimated route.

Under the above configuration, it is assumed that if executing a control function for the re-schedule is repeated greater than or equal to the reference number of times while the hybrid vehicle runs from the start point to the present position along the estimated route, there is a possibility that the fuel consumption be worsened. The operation of the scheduled running control unit or function can be thereby stopped. Herein, it is assumed that executing the re-schedule control function is repeated greater than or equal to the reference number of times should signify the charge schedule not functioning appropriately in this running or travel in the estimated route.

According to a second aspect of the present invention, a charge-discharge management apparatus is provided as follows for a battery of a hybrid vehicle, which uses an internal combustion engine driven by fuel combustion and a motor driven by the battery as a power source for running. A scheduling control unit is configured to (i) determine a schedule about whether or not to drive the hybrid vehicle using the motor and to charge the battery along an estimated route to a destination and (ii) estimate transition of a remaining quantity of the battery along the estimated route based on the schedule. A scheduled running control unit is configured, when the hybrid vehicle runs along the estimated route, to perform a control over whether or not to drive the hybrid vehicle using the motor and whether or not to charge the battery in accordance with the schedule. A stop control unit is configured to stop an operation of the scheduled running control unit based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position, when it is affirmatively determined that a distance from the present position to the destination is less than a reference distance value, when the hybrid vehicle runs along the estimated route.

Thus, in the event of the difference between the transition of the remaining battery quantity estimated by the schedule and the transition of the actual remaining battery quantity becoming greater, it is assumed that if the distance from the present position to the destination is less than the reference distance value, the control according to the schedule worsens fuel consumption, thus stopping the operation of the scheduled running control unit or function. This is based on the aspect that as the remaining distance to the destination is short, it is difficult to draw up a schedule to improve the fuel consumption.

According to a third aspect of the present invention, a charge-discharge management apparatus is provided as follows for a battery of a hybrid vehicle, which uses an internal combustion engine driven by fuel combustion and a motor driven by the battery as a power source for running. A learning control unit is configured to record, in a storage medium, information on a driving situation of the hybrid vehicle in a travel road which the hybrid vehicle has been traveled. A scheduling control unit is configured to (i) determine, based on the recorded information on the driving situation in an estimated route to a destination, a schedule about whether or not to drive the hybrid vehicle using the motor and to charge the battery along the estimated route and (ii) estimate transition of a remaining quantity of the battery along the estimated route based on the schedule. A scheduled running control unit is configured, when the hybrid vehicle runs along the estimated route, to perform a control over whether or not to drive the hybrid vehicle using the motor and whether or not to charge the battery in accordance with the schedule. A stop control unit is configured to stop an operation of the scheduled running control unit based on a difference exceeding a reference degree in the estimate route between a driving situation at a present travel and a driving situation recorded in the estimated route by the learning control unit, when the hybrid vehicle runs along the estimated route.

Herein, the driving situation signifies both or one of (i) an outside environment (for example, road slope) in the driving-time, and (ii) a vehicle behavior (for example, speed, power consumption, fuel consumption) in the driving-time.

Thus, it is assumed that if the difference between the driving situation on the estimated route recorded by the learning control unit or function and the actual driving situation becomes greater, the schedule may cause aggravation of fuel consumption. The operation of the scheduled running control unit or function can be thereby stopped. It is based on the aspect that if the driving situation obtained from the learning function is significantly deviated from the actual driving situation becomes greater, the charge schedule does not function appropriately in this running or travel of the estimated route.

According to a fourth aspect of the present invention, a charge-discharge management apparatus is provided as follows for a battery of a hybrid vehicle, which uses an internal combustion engine driven by fuel combustion and a motor driven by the battery as a power source for running. A scheduling control unit is configured to (i) determine a schedule about whether or not to drive the hybrid vehicle using the motor and to charge the battery along an estimated route to a destination and (ii) estimate transition of a remaining quantity of the battery along the estimated route based on the schedule. A scheduled running control unit is configured to control a hybrid control apparatus so as to operate in a passive control mode according to the schedule determined by the scheduling control unit when the hybrid vehicle runs the estimated route, the hybrid control apparatus being configured to switch an own operation mode between the passive control mode and an autonomous control mode based on a control from the charge-discharge management apparatus, the passive control mode which changes whether or not to drive the hybrid vehicle by the motor and whether or not charge the battery according to a control from the charge-discharge management apparatus, the autonomous control mode which changes whether or not to drive the hybrid vehicle by the motor and whether or not to charge the battery independent of a control from the charge-discharge management apparatus. A stop control unit is configured to stop an operation of the scheduled running control unit to thereby control the hybrid control apparatus so as to operate in the autonomous control mode based on receiving from the hybrid control apparatus a predetermined signal indicating that the passive control mode be inappropriate.

Thus, the hybrid control apparatus is configured to control as to whether or not to drive the hybrid vehicle by the motor and as to whether or not to charge the battery. The charge-discharge control apparatus can change such a hybrid control apparatus from the passive control mode to the autonomous control mode based on the reception of the predetermined signal indicating that the passive control mode is not appropriate. Thereby, it is detected that the charge schedule does not appropriately function, by using the determination result as to whether the passive control mode is appropriate in the hybrid control apparatus configured to control as to whether or not to drive the hybrid vehicle by the motor and as to whether or not to charge the battery.

According to a fifth aspect of the present invention, a computer readable medium comprising instructions being executed by a computer is provided as follows. The instructions include a computer-implemented method for managing a battery of a hybrid vehicle, which uses an internal combustion engine driven by fuel combustion and a motor driven by the battery as a power source for running. The instructions comprise: performing a scheduling which (i) determines a schedule about whether or not to drive the hybrid vehicle using the motor and to charge the battery along an estimated route to a destination and (ii) estimates transition of a remaining quantity of the battery along the estimated route based on the schedule; performing, when the hybrid vehicle runs along the estimated route, a hybrid control over whether or not to drive the hybrid vehicle using the motor and whether or not to charge the battery in accordance with the schedule; causing the scheduling to be performed again when the hybrid vehicle runs along the estimated route, based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position; and stopping performing of the hybrid control based on the scheduling having been performed a number of times greater than or equal to a reference times value while the hybrid vehicle travels from a start point to the present position along the estimated route.

According to a sixth aspect of the present invention, a computer readable medium comprising instructions being executed by a computer is provided as follows. The instructions include a computer-implemented method for managing a battery of a hybrid vehicle, which uses an internal combustion engine driven by fuel combustion and a motor driven by the battery as a power source for running. The instructions comprise: performing a scheduling which (i) determines a schedule about whether or not to drive the hybrid vehicle using the motor and to charge the battery along an estimated route to a destination and (ii) estimates transition of a remaining quantity of the battery along the estimated route based on the schedule; performing, when the hybrid vehicle runs along the estimated route, a hybrid control over whether or not to drive the hybrid vehicle using the motor and whether or not to charge the battery in accordance with the schedule; and stopping performing of the hybrid control based on the scheduling based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position, when it is affirmatively determined that a distance from the present position to the destination is less than a reference distance value, when the hybrid vehicle runs along the estimated route.

According to a seventh aspect of the present invention, a computer readable medium comprising instructions being executed by a computer is provided as follows. The instructions include a computer-implemented method for managing a battery of a hybrid vehicle, which uses an internal combustion engine driven by fuel combustion and a motor driven by the battery as a power source for running. The instructions comprise: recording, in a storage medium, information on a driving situation of the hybrid vehicle in a travel road which the hybrid vehicle has been traveled; performing a scheduling which (i) determines, based on the recorded information on the driving situation in an estimated route to a destination, a schedule about whether or not to drive the hybrid vehicle using the motor and to charge the battery along the estimated route and (ii) estimates transition of a remaining quantity of the battery along the estimated route based on the schedule; performing, when the hybrid vehicle runs along the estimated route, a hybrid control over whether or not to drive the hybrid vehicle using the motor and whether or not to charge the battery in accordance with the schedule; and stopping performing the hybrid control based on a difference exceeding a reference degree in the estimate route between a driving situation at a present travel and a driving situation recorded in the estimated route, when the hybrid vehicle runs along the estimated route.

According to an eighth aspect of the present invention, a computer readable medium comprising instructions being executed by a computer is provided as follows. The instructions include a computer-implemented method for managing a battery of a hybrid vehicle, which uses an internal combustion engine driven by fuel combustion and a motor driven by the battery as a power source for running. The instructions comprise: performing a scheduling which (i) determines a schedule about whether or not to drive the hybrid vehicle using the motor and to charge the battery along an estimated route to a destination and (ii) estimates transition of a remaining quantity of the battery along the estimated route based on the schedule; performing a hybrid control to control a hybrid control apparatus so as to operate in a passive control mode according to the determined schedule when the hybrid vehicle runs the estimated route, the hybrid control apparatus being configured to switch an own operation mode between the passive control mode and an autonomous control mode based on an instruction issued from the hybrid control, the passive control mode which changes whether or not to drive the hybrid vehicle by the motor and whether or not charge the battery according to an instruction issued from the hybrid control, the autonomous control mode which changes whether or not to drive the hybrid vehicle by the motor and whether or not to charge the battery independent of an instruction issued from the hybrid control; and stopping performing the hybrid control to thereby control the hybrid control apparatus so as to operate in the autonomous control mode based on an instruction issued from the hybrid control a predetermined signal indicating that the passive control mode be inappropriate.

In addition, according to another aspect of the present invention, all the control units included in each of the above charge-discharge management apparatuses according to the first to fourth aspects can be realized as instructions included in a computer readable medium for activating or achieving each charge-discharge management apparatus.

BRIEF DESCRIPTION OF THE DRAWINGS

The above and other objects, features, and advantages of the present invention will become more apparent from the following detailed description made with reference to the accompanying drawings. In the drawings:

FIG. 5 is a flow chart showing a route calculation process;

FIG. 6 is a flow chart showing a charge scheduling process;

DETAILED DESCRIPTION OF THE PREFERRED EMBODIMENTS

Figure 1:
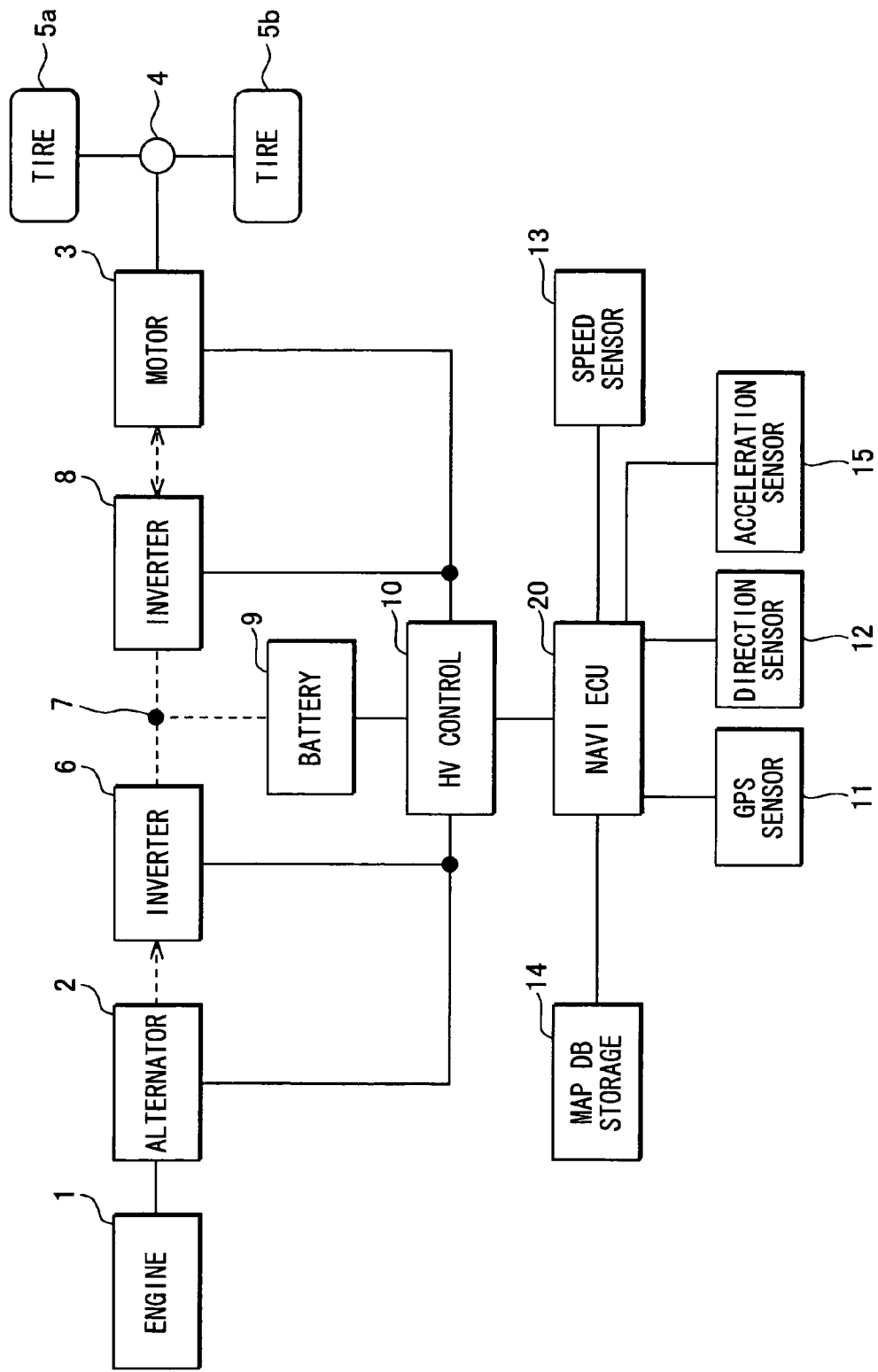
FIG. 1 schematically shows a construction of a hybrid vehicle according to an embodiment of the present invention.

The following describes an embodiment of the present invention. FIG. 1 schematically shows a construction example of a hybrid vehicle according to the embodiment. The hybrid vehicle includes an engine 1 as an internal combustion engine, an alternator 2, a motor 3, a differential gear unit 4, a tire 5a, a tire 5b, an inverter 6, a DC link 7, an inverter 8, a battery 9, an HV (Hybrid Vehicle) control section 10, a GPS sensor 11, a direction sensor 12, a vehicle speed sensor 13, a map DB storage section 14, an acceleration sensor 15, and a navigation ECU (Electronic Control Unit) 20.

The hybrid vehicle runs using the engine 1 and the motor 3 as a power source. When the engine 1 is used as the power source, a rotation of the engine 1 is transmitted to the tires 5a and 5b via an unshown clutch mechanism and the differential gear unit 4. When the motor 3 is used as the power source, a direct current of the battery 9 is converted into an alternating power via the DC link 7 and the inverter 8. The motor 3 operates on the alternating power. A rotation of the motor 3 is transmitted to the tires 5a and 5b via the differential gear unit 4. The following description refers to two modes of driving, that is, engine driving and assist driving. The engine driving uses only the engine 1 as the power source. The assist driving uses at least the motor 3 as the power source including or excluding the engine 1.

The rotation of the engine 1 is also transmitted to the alternator 2. The rotation causes the alternator 2 to generate an alternating power. The generated alternating power is converted into a direct power via the inverter 6 and the DC link 7. The direct current power may be charged in the battery 9. That is, the engine 1 operates using fuel to charge the battery 9. This type of charging is hereafter referred to as internal combustion charging.

When an unshown braking mechanism decelerates the hybrid vehicle, a resisting force during the deceleration is added as a torque to the motor 3. The torque allows the motor 3 to generate an alternating power. The generated alternating power is converted into a direct power via the inverter 8 and the DC link 7. The direct power is charged in the battery 9. In the following description, this type of charging is referred to as regenerative charging.

In accordance with an instruction or signal from the navigation ECU 20 or the like, the HV control section 10 controls whether or not to operate the alternator 2, the motor 3, the inverters 6 and 8, and the battery 9. The HV control section 10 may use a microcomputer or hardware device having a dedicated circuit construction for embodying the following functions.

For example, the HV control section 10 stores two values, that is, a present SOC (State Of Charge) and a reference SOC. The HV control section 10 performs the following processes (A) to (C).

(A) Based on an instruction from the navigation ECU 20, the HV control section 10 controls actuators for the alternator 2, the motor 3, the inverters 6 and 8, and the battery 9 in an autonomous control mode or passive control mode.

(B) The HV control section 10 periodically notifies the present SOC to the navigation ECU 20.

(C) The HV control section 10 determines whether a predetermined schedule cancellation condition is satisfied, and transmits, when satisfied, a predetermined notice of NG (No-Good) to the navigation ECU 20.

The SOC (State of Charge) is an index for indicating a remaining battery quantity. A higher value indicates a larger remaining quantity. The present SOC indicates an SOC of the battery 9 at the present time. The HV control section 10 repeatedly updates the present SOC (or SOC value) by successively detecting states of the battery 9. A reference SOC provides a value such as 60% used for the autonomous control mode.

The autonomous control mode and the passive control mode are described below. In the autonomous control mode, the HV control section 10 determines a driving method and controls the actuators based on the determined driving method so that the present SOC may be maintained in the reference SOC or approximate values thereof. For instance, the driving method chooses between the engine driving and the assist driving and between the internal combustion charging and the regenerative charging. In the autonomous control mode, the HV control section 10 determines the driving method and provides control in accordance with the determination, independently of the navigation ECU 20, based on the present SOC as the quantity acquired only from the present vehicle situation, not on a value for an estimated vehicle situation in the future.

In the passive control mode, the HV control section 10 chooses between the engine driving and the assist driving as driving mode for the hybrid vehicle based on a control signal as an instruction from the navigation ECU 20. The HV control section 10 also provides control for changing between the internal combustion charging and the regenerative charging to be performed. In the embodiment, the control signal is equivalent to a signal for a target SOC to be described. The HV control section 10 controls the actuators based on the determination of the driving method and the determined driving method so that the present SOC is maintained in the target SOC and approximate values of the target SOC.

As will be described later, the target SOC is a quantity determined based on advance scheduling of a driving method for the vehicle. The HV control section 10 provides the control appropriate to the target SOC in the passive control mode and simultaneously provides the control based on the advance scheduling of the driving method for the vehicle.

The HV control section 10 assumes its operation mode to be the autonomous control mode during a normal operation, for instance, after a vehicle engine is normally turned on. In addition, when receiving a signal of the target SOC from the navigation ECU 20, the HV control section 10 changes its operation mode from the autonomous control mode to the passive control mode. When receiving a notice of stopping the scheduled running (to be mentioned later) from the navigation ECU 20, the HV control section 10 changes its operation mode from the passive control mode to the autonomous control mode.

In addition, although the above-mentioned details and schedule cancellation condition in the operation (C) are mentioned later, this NG signal (equivalent to an example of a predetermined signal) is to signify that the HV control section 10 determines that the charge schedule of the navigation ECU 20 is not reliable.

The GPS sensor 11, the direction sensor 12, and the vehicle speed sensor 13 are known sensors that are used to respectively detect a position, a driving direction, and a driving speed of the hybrid vehicle. The map DB storage section 14 is a storage medium for storing map data. The acceleration sensor 15 is a known sensor for detecting a vehicle acceleration. The vehicle speed sensor 13 and the acceleration sensor 15 are used to calculate an inclination or an inclined angle.

The map data contains node data corresponding to each of intersections and link data corresponding to each link, that is, a road path connecting intersections with each other. The node data contains, with respect to each node, an identification number, location information, and type information about the node. The link data contains, with respect to each link, an identification number (hereafter referred to as link ID), location information, and type information about the link.

The position information about the link contains location data of a shape supplementing point contained in the link and data about a (road) segment connecting nodes at both ends of the link and connecting two adjacent shape supplementing points. Each segment data contains information such as a segment ID of the segment, an inclination, direction, and length of the segment.

Figure 2:
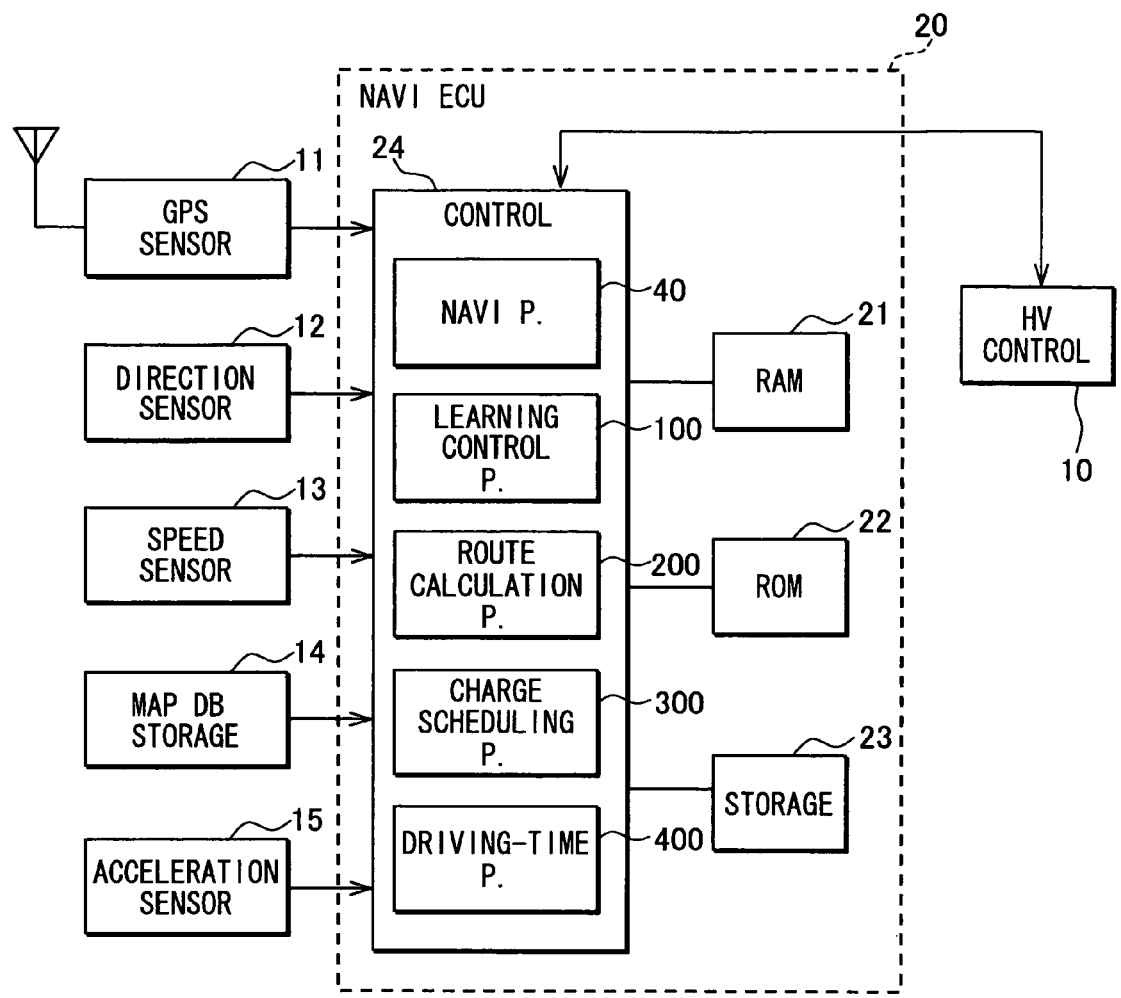
FIG. 2 is a block diagram showing a construction of a navigation ECU and a connection thereof with an outside.

As shown in FIG. 2, the navigation ECU 20 includes RAM 21, ROM 22, a durable storage medium 23 capable of writing data, and a control section 24. The durable storage medium 23 can continuously maintain data even when a supply of main power to the navigation ECU 20 stops. The durable storage medium 23 represents, for example, a nonvolatile storage medium such as a hard disk, flash memory, and EEPROM, and backup RAM.

The control section 24 performs a program read from the ROM 22 or the durable storage medium 23. At this time, the control section 24 reads information from the RAM 21, the ROM 22, and the durable storage medium 23. The control section 24 writes information to the RAM 21 and the durable storage medium 23. The control section 24 exchanges signals with the HV control section 10, the GPS sensor 11, the direction sensor 12, the vehicle speed sensor 13, the map DB storage section 14, and the acceleration sensor 15.

For instance, the control section 24 performs specified programs to implement a navigation process 40, a learning control process 100, a route calculation process 200, a charge scheduling process 300, and a driving-time process 400.

The route calculation process 200 settles a route to a destination. This route is hereafter referred to as an estimated route, an example of a scheduled route. In the navigation process 40, the control section 24 provides a driver with a guide display for driving the hybrid vehicle along the estimated route using an image display apparatus and a speaker (not shown).

Figure 3:
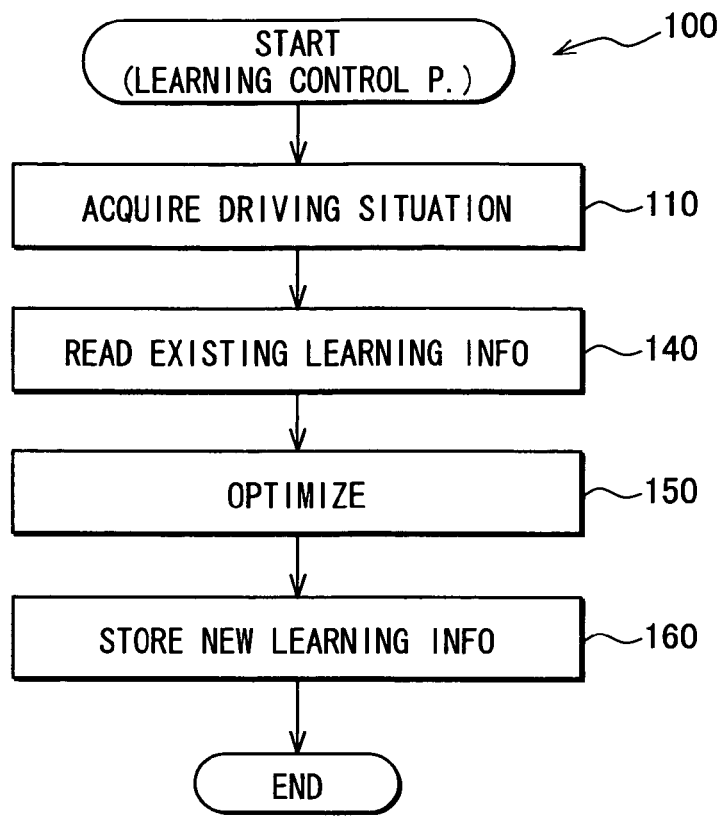
FIG. 3 is a flow chart showing a learning control process.

In the learning control process 100, the control section 24 records a road traveled by the hybrid vehicle and a history of driving situations on the road in the durable storage medium 23 on a (road) segment basis. Driving situations affect power consumption of the battery 9 while the vehicle runs on the road. FIG. 3 shows a flow chart of the learning control process 100. The process assumes the same segment to be a different one when the driving direction differs.

The control section 24 repeatedly performs the learning control process 100 in FIG. 3. At Step 110 in each repetition, the control section 24 acquires information about the present driving situation. The driving situation provides information about either or both (i) external environment during driving and (ii) vehicle behavior during driving. The information acquired as the driving situation includes a link ID of a link for the present driving, a segment ID of a (road) segment for the present driving, a direction of the present vehicle, a present vehicle speed, a road inclination at the present position, a road type of the link, an electric power consumption for the segment, etc.

The control section 24 can specify the link ID and the segment ID by collating to each other (i) information about the present position from the GPS sensor 11 and (ii) information about the map data from the map DB storage section 14. The vehicle direction can be acquired from the direction sensor 12. The present vehicle speed can be acquired from the vehicle speed sensor 13. The control section 24 may calculate the road inclination using outputs from the vehicle speed sensor 13 and the acceleration sensor 15. The road type of the road is acquired from the map data. The control section 24 can calculate a travel distance in the link using outputs from the vehicle speed sensor 13.

At Step 140, the control section 24 reads existing learning information. For instance, the durable storage medium 23 may store history information about the driving situation corresponding to the segment ID acquired at Step 110. When this is the case, the control section 24 reads the information.

At Step 150, the control section 24 optimizes the segment information read at Step 140 and the driving situation information about the segment acquired at Step 110 in combination with each other. For the optimization, the control section 24 may calculate an average of the read information and the newly acquired information. When the driving situation history for the segment is unavailable at Step 140, the control section 24 proceeds to Step 150 and assumes the data acquired at Step 110 to be optimized data. The optimized driving situation data contains the segment ID, with which information about the road and the driving situation for the road can be associated with each other.

At Step 160, the control section 24 stores the optimized data as a new driving situation history about the segment, that is, learning information in the durable storage medium 23. After Step 160, one cycle of the learning control process 100 terminates.

Figure 4:
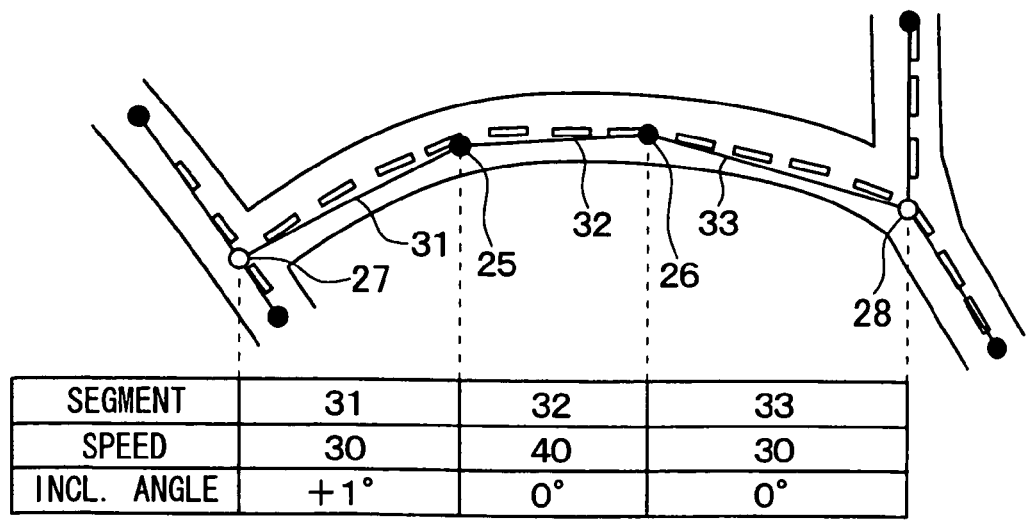
FIG. 4 shows an example of driving situation history for each road segment.

When the learning control process 100 is performed, the durable storage medium 23 records the driving situation history about each of segments near a point capable of charging. FIG. 4 exemplifies a table of the driving situation history recorded in the durable storage medium 23 along with a road associated with the history.

Segments 31 through 33 are formed between a node 27, shape supplementary points 25 and 26, and a node 28. The driving situation history table shows vehicle speeds for driving the segments and road inclinations of the segments. These data affect power consumption and charge amount of the battery 9 while the vehicle runs through the segments. For example, an engine load increases as the road inclination becomes steep uphill and the vehicle speed increases. The assist driving at the segment increases the power consumption. As the road inclination becomes steep downhill, the regenerative charging at the segment generates a large charge amount.

FIG. 5 shows a flow chart of the route calculation process 200. The control section 24 executes the process 200 whenever a destination point (or destination) is determined. Here, the control section 24 may determine the destination based on an input operation of the user via an operation device or based on a past driving history.

In execution of one cycle of this route calculation process 200, at Step 210, the control section 24 determines an optimal estimated route from a present position as a start point to the destination based on the map data etc. At Step 230, the control section 24 requests the HV control section 10 for information about the present SOC. The HV control section 10 transmits information about the present SOC in response to the request. The control section 24 receives the present SOC.

At Step 240, the control section 24 reads learning information from the durable storage medium 23. The learning information is a history of driving situations for (road) segments, which are included in an extended path (hereinafter called a determination path) from the destination along the estimated route.

Then, at Step 250, execution of the charge scheduling process 300 is called based on the information acquired at Steps 230 and 240. The control section 24 thus starts the charge scheduling process 300 for the estimated route immediately after determining the estimated route up to the destination.

FIG. 6 shows a flow chart of the charge scheduling process 300. The charge scheduling process 300 schedules a driving method for the vehicle as a charge schedule within the determination path.

For instance, at Step 310, the control section 24 uses the learning information within the determination path to calculate an energy needed for driving through each of segments within the determination path. A method of calculating necessary energy is already known and a detailed description is omitted.

Figure 7:
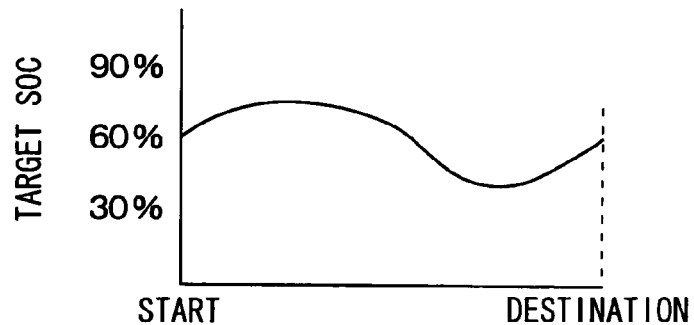
FIG. 7 is a graph showing transition of SOC estimated by the charge scheduling process.

At Step 320, the control section 24 determines an optimum driving method for each segment up to the destination based on the acquired learning information and the acquired present SOC. At Step 330, the control section 24 creates an SOC management schedule based on the learning information. The SOC management schedule shows estimated SOC transition up to the destination. FIG. 7 shows a graph as an example of the estimated SOC transition. A value at each point of the estimated SOC transition is referred to as a target SOC. After Step 380, the control section 24 terminates one cycle of the charge scheduling process 300.

Figure 8:
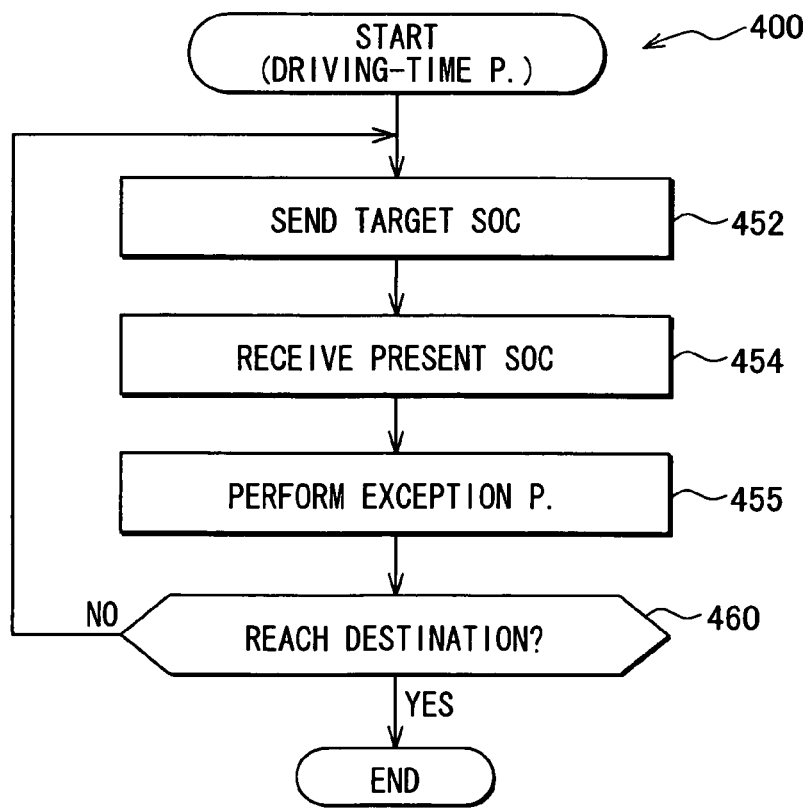
FIG. 8 is a flow chart showing a driving-time process.

FIG. 8 shows a flow chart of the driving-time process 400. This driving-time process 400 is executed by the control section 24 when the following conditions are simultaneously fulfilled: (i) the destination and the estimated route to the destination are determined; (ii) the charge scheduling process 300 has been executed with respect to the estimated route; (iii) the navigation process 40 executes a guide display for the estimated route; and (iv) the hybrid vehicle runs the estimated route.

At Step 452 of the driving-time process 400, the control section 24 reads the target SOC corresponding to the present position from the SOC management schedule and transmits the read target SOC to the HV control section 10. When receiving the target SOC, the HV control section 10 controls the driving method of the vehicle on the determination path so as to comply with the SOC management schedule derived from the driving method according to the charge schedule. As a result, in many cases, the HV control section 10 can control the driving method of the vehicle in accordance with the charge schedule and reduce the fuel consumption. At Step 454, the control section 24 receives the present SOC from the HV control section 10.

At Step 455, the control section 24 performs an exception process. The details of the exception process are mentioned later. At Step 460, the control section 24 checks a signal from the GPS sensor 11 to determine whether or not the hybrid vehicle reaches the destination. The control section 24 repeats Steps 452 through 460 until the hybrid vehicle reaches the destination. When the hybrid vehicle reaches the destination, the control section 24 terminates the driving-time process 400.

Figure 9:
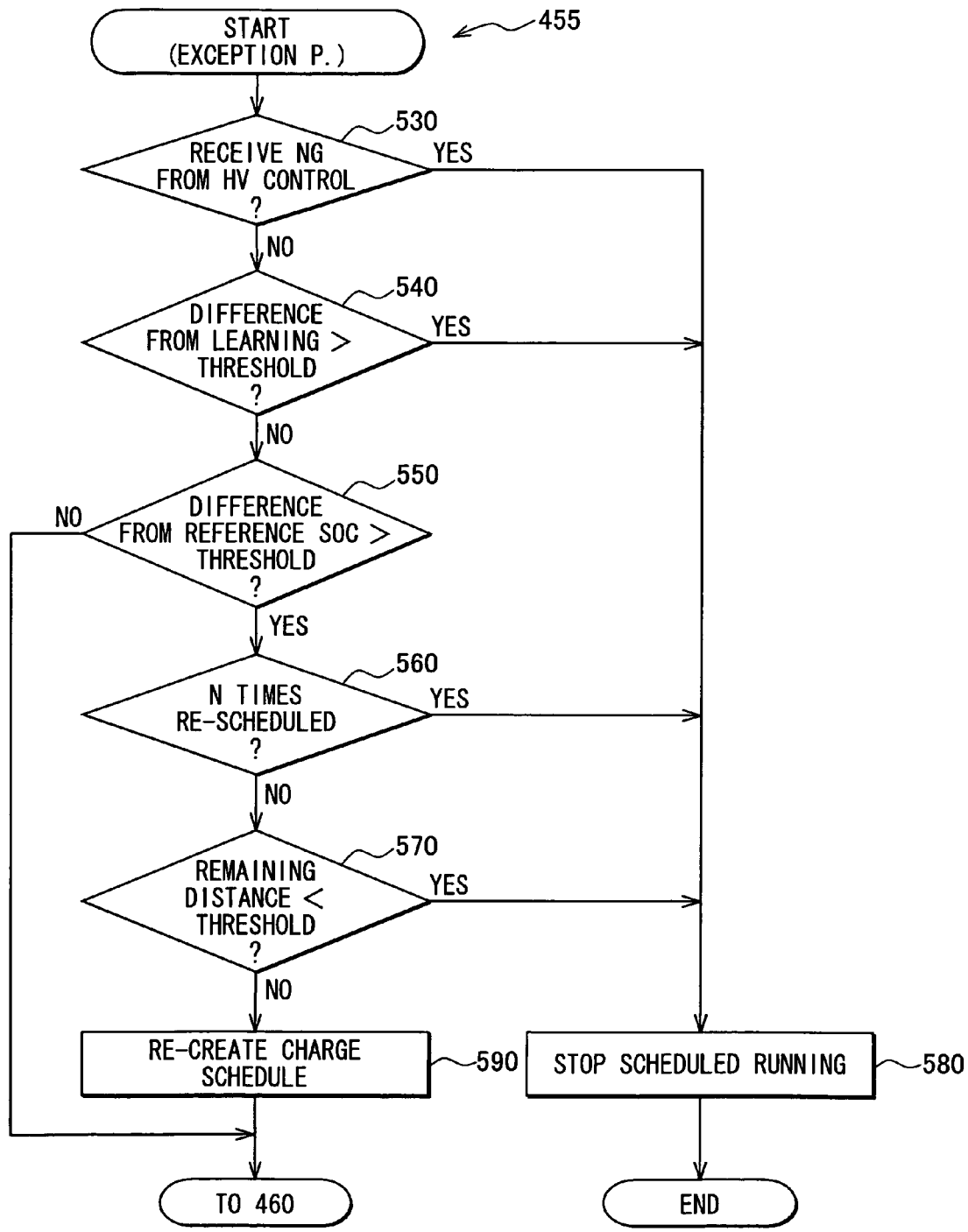
FIG. 9 is a flow chart showing an exception process.

Here, the details of the exception process of Step 455 are explained. FIG. 9 shows a flow chart of the exception process. In this exception process, at Step 530, the control section 24 determines whether a notice of NG (No-Good) is received from the HV control section 10. When the determination result is affirmative, Step 580 is executed subsequently. When negative, Step 540 is executed subsequently.

At Step 540, two travel patterns (as an example of driving situation information) are compared, and it is determined whether the difference therebetween is larger than a reference range (as an example of a reference difference value or threshold value). A travel pattern is transition of a speed, for example. Two travel patterns used for the above determination are (i) the travel pattern from the start point to the present position of the estimated route indicated in the learning information, and (ii) the actual travel pattern from the start point to the present position in this travel.

The calculation of the difference between the two travel patterns is executed as follows. For example, (i) multiple points on the route from the start point to the present position of the estimated route may be extracted (with for example, fixed distance intervals); (ii) the difference in the speeds of the two patterns may be calculated with respect to each of the extracted points; and (iii) a total of the absolute values of the calculated speed differences of the individual points may be calculated to thereby obtain the difference of the travel patterns. That is, the integrated value of the gap of the speeds between the two patterns may be the difference or the degree of deviation. Alternatively, the differences in accelerations in the two patterns in the individual points may be integrated to obtain the difference of the two patterns. When the determination result at Step 540 is affirmative, Step 580 is executed subsequently. When negative, Step 550 is executed subsequently.

At Step 550, the present SOC most recently received at Step 454 in FIG. 8 is compared with the target SOC corresponding to the present position. It is determined whether the difference is greater than a reference range (as example of a reference quantity value or threshold value). When the determination result is negative, the processing escapes from the exception process to advance to Step 460 in the driving-time process 400. When the determination result is affirmative, Step 560 is executed subsequently.

At Step 560, it is determined whether the number of times of the re-schedule is greater than or equal to a predetermined number of times N as an example of a reference times value or a threshold value. If it is greater than or equal to the predetermined number of times N, Step 580 is will be executed subsequently. If it is less than the predetermined number of times N, Step 570 is executed subsequently. The number of times of the re-schedule means the number of times the charge scheduling process at Step 590 (to be mentioned later) is executed after the hybrid vehicle starts the travel from the start point of the estimated route before reaching the present position.

At Step 570, the remaining distance is calculated. The remaining distance is a distance from the present position to the destination along the estimated route or a distance in a straight line from the present position to the destination. It is determined whether the calculated remaining distance is less than a predetermined distance as an example of a reference distance value or a threshold value. If it is less than the predetermined distance, Step 580 is executed subsequently. If it is not less than the predetermined distance, Step 590 is executed subsequently.

At Step 580, a notice of the scheduled running stop is outputted to the HV control section 10, and the processing ends one cycle of the driving-time process 400. Thereby, the HV control section 10 changes its operation mode to the above-mentioned autonomous control mode.

At Step 590, the charge schedule for the path from the present position to the destination along the estimated route is again drawn up as a charge re-schedule by calling execution of the charge scheduling process 300. The SOC management schedule according to the just presently drawn-up charge schedule is substituted for the (previous) SOC management schedule until the present time. After Step 590, the processing escapes from the exception process and proceeds to Step 460 in the driving-time process 400.

Thus, in executing the above driving-time processes 400, the control section 24 repeats Steps of 530→540→550→460→452→454 in this order when the following conditions are simultaneously fulfilled: (i) the hybrid vehicle is on the way to the destination along the estimated route (refer to Step 460); (ii) the notice of NG is not received from the HV control section 10 (refer to Step 530); (iii) the difference between the speed pattern indicated by the learning information and the present speed pattern is less than the reference range (refer to Step 540); and (iv) the difference between the target SOC and the present SOC is less than the reference range (refer to Step 550). As a result, the HV control section 10 continues control according to the present charge schedule.

In contrast, in the event that the difference between the target SOC and the present SOC is not less than the reference range (refer to Step 550), if the following conditions are simultaneously fulfilled, (i) the number of times of the re-schedule is less than N times (refer to Step 560) and (ii) the remaining distance to the destination is greater than or equal to the predetermined distance (refer to Step 570), the charge schedule is drawn up again as a charge re-schedule to thereby correct the charge schedule so as to suit the actual situation. As a result, the HV control section 10 executes control according to the charge schedule after correction, i.e., according to the re-schedule.

However, if the notice of NG is received from the HV control section 10 (refer to Step 530) or the difference between the speed pattern indicated by the learning information and the present speed pattern is not less than the reference range (refer to Step 540), the control section 24 entirely stops controlling the HV control section 10 based on the charge schedule (refer to Step 580). Thereby, the HV control section 10 comes to execute a usual operation according to the autonomous control mode.

In addition, assuming that the difference between the target SOC and the present SOC becomes greater than or equal to the reference range (refer to Step 550), either when the number of times of the re-schedule becomes greater than or equal to N times (refer to Step 560) or when a remaining distance to a destination becomes less than a predetermined distance (refer to Step 570), the control of the HV control section based on the charge schedule is also entirely stopped without the charge schedule drawn up again. Thereby, the HV control section 10 comes to execute a usual operation according to the autonomous control mode.

Here, the above-mentioned operation (C) of the HV control section 10, which sends out the notice of NG, is explained. The schedule cancellation condition in the operation (C) is satisfied when the HV control section 10 determines that the charge schedule of the navigation ECU 20 is not reliable. For example, the HV control section 10 compares the detected present SOC with the target SOC received from the navigation ECU 20. When the difference between the present SOC and the target SOC is greater than or equal to a predetermined threshold value, the HV control section 10 returns the notice of NG. In this example, the schedule cancellation condition is equivalent to a condition that the difference of the present SOC and the target SOC is greater than or equal to the threshold value.

In addition, although the control section 24 of the navigation ECU 20 also determines at Step 550 whether the difference of the present SOC and the target SOC is greater than or equal to a threshold value, the threshold value in such a determination at Step 550 differs from a threshold value associated with the schedule cancellation condition. For example, the threshold value at Step 550 is smaller than the threshold value associated with the schedule cancellation condition.

The threshold value (hereinafter the threshold value A) at Step 550 is a value designated when manufacturing the navigation ECU 20; the threshold value (hereinafter the threshold value B) associated with the schedule cancellation condition is designated when manufacturing the HV control section 10. In many cases, the threshold value A in the navigation ECU 20 is determined regardless of a vehicle where the navigation ECU 20 is mounted; the threshold value B in the HV control section 10 is determined or adjusted as being specific to each type of a vehicle where the HV control section 10 is mounted.

Under the above operations, the navigation ECU 20 assumes as follows: if an execution of re-schedule control function is repeated greater than or equal to the reference number of times while the hybrid vehicle runs from the start point to the present position along the estimated route, there may be a possibility that the control according to the charge schedule or re-schedule worsens the fuel consumption. The scheduled running is thus stopped and the HV control section 10 is moved to the autonomous control mode. Herein, it is assumed that executing the re-schedule control or function is repeated greater than or equal to the reference number of times should signify the charge schedule not functioning appropriately in this running or travel in the estimated route.

In addition, when the difference between the transition of the SOC estimated by the charge schedule and the transition of the actual SOC becomes greater, the navigation ECU 20 assumes if the distance from the present position to the destination is less than the reference distance value, the control according to the charge schedule worsens fuel consumption, thus stopping the operation of the scheduled running control or function. This is based on the aspect that as the remaining distance to the destination is short, it is difficult to draw up a schedule to improve the fuel consumption.

In addition, the navigation ECU 20 thus assumes that if the difference between the driving situation (i.e., travel pattern) on the estimated route recorded in the learning control process 100 and the actual driving situation becomes greater, the control according to the schedule worsens fuel consumption. The scheduled running is thus stopped and the HV control section 10 is moved to the autonomous control mode. It is based on the aspect that if the driving situation obtained from the learning function is significantly deviated from the actual driving situation becomes greater, charge scheduling based on the recorded driving situation does not function appropriately in this running or travel in the estimated route.

In addition, the navigation ECU 20 changes the HV control section 10 from the passive control mode to the autonomous control mode based on having received from the HV control section 10 the predetermined NG signal indicative of the passive control mode being unsuitable. Thereby, the navigation ECU 20 detects that the charge schedule is not appropriately drawn up, by using the determination result by the HV control section 10 as to whether or not the passive control is appropriately functioning in the HV control section 20 itself.

In addition, in the embodiment, the navigation ECU 20 is equivalent to an example of a charge-discharge management apparatus, the HV control section 10 is equivalent to an example of a hybrid control apparatus, and the durable storage medium 23 is equivalent to an example of a storage medium. The control section 24 functions as an example of a learning means or a learning control unit by executing the learning control process 100. Further, the control section 24 functions as an example of a scheduling means or a scheduling control unit by executing the charge scheduling process 300. Further, the control section 24 functions as an example of a scheduled running means or a scheduled running control unit by executing Step 452 of the driving-time process 400. Further, the control section 24 functions as an example of a re-schedule means or a re-schedule control unit by executing Step 590. Yet further, the control section 24 functions as an example of a stop means or a stop control unit by executing Step 580.

Other Embodiments

While there have been described specific preferred embodiments of the present invention, it is to be distinctly understood that the present invention is not limited thereto and includes various modes capable of embodying functions of specifics of the invention.

For example, the cause by which the HV control section 10 transmits the notice of NG does not need to be above. That is, as long as it transmits the predetermined NG signal based on having detected that operating by the passive control mode is unsuitable as for the HV control section 10, any detection method can be adopted.

The above-mentioned embodiments use a (road) segment as a unit of calculating the power consumption and the charge amount and creating the charge schedule. A (road) segment may be replaced by a (road) link.

According to the above-mentioned embodiments, the navigation ECU 20 performs the charge scheduling process 300 and the driving-time process 400. The navigation ECU 20 may perform all of these processes. The navigation ECU 20 may perform part of the processes and the HV control section 10 may perform the remainder.

According to the embodiments, the control section 24 performs the programs to implement the functions. The functions may be replaced by a hardware device having the equivalent functions. Such hardware device examples include an FPGA capable of programming the circuit construction.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A charge-discharge management apparatus for a battery of a hybrid vehicle, which uses an internal combustion engine driven by fuel combustion and a motor driven by the battery as a power source for running, the apparatus comprising:
   a scheduling control unit configured to (i) determine a schedule about whether or not to drive the hybrid vehicle using the motor and to charge the battery along an estimated route to a destination and (ii) estimate transition of a remaining quantity of the battery along the estimated route based on the schedule;
   a scheduled running control unit configured, when the hybrid vehicle runs along the estimated route, to perform a control over whether or not to drive the hybrid vehicle using the motor and whether or not to charge the battery in accordance with the schedule;
   a re-scheduling control unit configured to operate to cause the scheduling control unit to operate again when the hybrid vehicle runs along the estimated route, based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position; and
   a stop control unit configured to stop an operation of the scheduled running control unit based on the re-scheduling control unit having operated a number of times greater than or equal to a reference times value while the hybrid vehicle travels from a start point to the present position along the estimated route; wherein
   after the stop control unit stops the operation of the scheduled running control unit, an autonomous control mode is executed, the autonomous control mode controlling to maintain the remaining quantity of the battery at the reference quantity value regardless of whether the hybrid vehicle runs along the estimated route.

2. A charge-discharge management apparatus for a battery of a hybrid vehicle, which uses an internal combustion engine driven by fuel combustion and a motor driven by the battery as a power source for running, the apparatus comprising:
   a scheduling control unit configured to (i) determine a schedule about whether or not to drive the hybrid vehicle using the motor and to charge the battery along an estimated route to a destination and (ii) estimate transition of a remaining quantity of the battery along the estimated route based on the schedule;
   a scheduled running control unit configured, when the hybrid vehicle runs along the estimated route, to perform a control over whether or not to drive the hybrid vehicle using the motor and whether or not to charge the battery in accordance with the schedule; and
   a stop control unit configured to stop an operation of the scheduled running control unit based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position, when it is affirmatively determined that a distance from the present position to the destination is less than a reference distance value, when the hybrid vehicle runs along the estimated route; wherein
   after the stop control unit stops the operation of the scheduled running control unit, an autonomous control mode is executed, the autonomous control mode controlling to maintain the remaining quantity of the battery at the reference quantity value regardless of whether the hybrid vehicle runs along the estimated route.

3. A charge-discharge management apparatus for a battery of a hybrid vehicle, which uses an internal combustion engine driven by fuel combustion and a motor driven by the battery as a power source for running, the apparatus comprising:
   a learning control unit configured to record, in a storage medium, information on a driving situation of the hybrid vehicle in a travel road which the hybrid vehicle has been traveled;
   a scheduling control unit configured to (i) determine, based on the recorded information on the driving situation in an estimated route to a destination, a schedule about whether or not to drive the hybrid vehicle using the motor and to charge the battery along the estimated route and (ii) estimate transition of a remaining quantity of the battery along the estimated route based on the schedule;
   a scheduled running control unit configured, when the hybrid vehicle runs along the estimated route, to perform a control over whether or not to drive the hybrid vehicle using the motor and whether or not to charge the battery in accordance with the schedule; and
   a stop control unit configured to stop an operation of the scheduled running control unit based on a difference exceeding a reference degree in the estimate route between a driving situation at a present travel and a driving situation recorded in the estimated route by the learning control unit, when the hybrid vehicle runs along the estimated route; wherein
   after the stop control unit stops the operation of the scheduled running control unit, an autonomous control mode is executed, the autonomous control mode controlling to maintain the remaining quantity of the battery at the reference quantity value regardless of whether the hybrid vehicle runs along the estimated route.

4. A charge-discharge management apparatus for a battery of a hybrid vehicle, which uses an internal combustion engine driven by fuel combustion and a motor driven by the battery as a power source for running, the apparatus comprising:
   a scheduling control unit configured to (i) determine a schedule about whether or not to drive the hybrid vehicle using the motor and to charge the battery along an estimated route to a destination and (ii) estimate transition of a remaining quantity of the battery along the estimated route based on the schedule;

a scheduled running control unit configured to control a hybrid control apparatus so as to operate in a passive control mode according to the schedule determined by the scheduling control unit when the hybrid vehicle runs the estimated route, the hybrid control apparatus being configured to switch an own operation mode between the passive control mode and an autonomous control mode based on a control from the charge-discharge management apparatus, the passive control mode which changes whether or not to drive the hybrid vehicle by the motor and whether or not charge the battery according to a control from the charge-discharge management apparatus, the autonomous control mode which changes whether or not to drive the hybrid vehicle by the motor and whether or not to charge the battery independent of a control from the charge-discharge management apparatus; and a stop control unit configured to stop an operation of the scheduled running control unit to thereby control the hybrid control apparatus so as to operate in the autonomous control mode based on receiving from the hybrid control apparatus a predetermined signal indicating that the passive control mode be inappropriate; wherein after the stop control unit stops the operation of the scheduled running control unit, the autonomous control mode is executed, the autonomous control mode controlling to maintain the remaining quantity of the battery at the reference quantity value regardless of whether the hybrid vehicle runs along the estimated route.

5. A computer readable medium comprising instructions being executed by a computer, the instructions including a computer-implemented method for managing a battery of a hybrid vehicle, which uses an internal combustion engine driven by fuel combustion and a motor driven by the battery as a power source for running, the instructions comprising:

performing a scheduling which (i) determines a schedule about whether or not to drive the hybrid vehicle using the motor and to charge the battery along an estimated route to a destination and (ii) estimates transition of a remaining quantity of the battery along the estimated route based on the schedule;

performing, when the hybrid vehicle runs along the estimated route, a hybrid control over whether or not to drive the hybrid vehicle using the motor and whether or not to charge the battery in accordance with the schedule;

causing the scheduling to be performed again when the hybrid vehicle runs along the estimated route, based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position;

stopping performing of the hybrid control based on the scheduling having been performed a number of times greater than or equal to a reference times value while the hybrid vehicle travels from a start point to the present position along the estimated route; and executing an autonomous control mode after stopping performing of the hybrid control based on the scheduling, the autonomous control mode controlling to maintain the remaining quantity of the battery at the reference quantity value regardless of whether the hybrid vehicle runs along the estimated routed.

6. A computer readable medium comprising instructions being executed by a computer, the instructions including a computer-implemented method for managing a battery of a hybrid vehicle, which uses an internal combustion engine driven by fuel combustion and a motor driven by the battery as a power source for running, the instructions comprising:

performing a scheduling which (i) determines a schedule about whether or not to drive the hybrid vehicle using the motor and to charge the battery along an estimated route to a destination and (ii) estimates transition of a remaining quantity of the battery along the estimated route based on the schedule;

performing, when the hybrid vehicle runs along the estimated route, a hybrid control over whether or not to drive the hybrid vehicle using the motor and whether or not to charge the battery in accordance with the schedule;

stopping performing of the hybrid control based on the scheduling based on a remaining battery quantity difference being greater than or equal to a reference quantity value, the remaining battery quantity difference being a difference in a remaining quantity of the battery between a detected quantity at a present position of the hybrid vehicle and a scheduled quantity according to the schedule at the present position, when it is affirmatively determined that a distance from the present position to the destination is less than a reference distance value, when the hybrid vehicle runs along the estimated route; and executing an autonomous control mode after stopping performing of the hybrid control based on the scheduling, the autonomous control mode controlling to maintain the remaining quantity of the battery at the reference quantity value regardless of whether the hybrid vehicle runs along the estimated routed.

7. A computer readable medium comprising instructions being executed by a computer, the instructions including a computer-implemented method for managing a battery of a hybrid vehicle, which uses an internal combustion engine driven by fuel combustion and a motor driven by the battery as a power source for running, the instructions comprising:

recording, in a storage medium, information on a driving situation of the hybrid vehicle in a travel road which the hybrid vehicle has been traveled;

performing a scheduling which (i) determines, based on the recorded information on the driving situation in an estimated route to a destination, a schedule about whether or not to drive the hybrid vehicle using the motor and to charge the battery along the estimated route and (ii) estimates transition of a remaining quantity of the battery along the estimated route based on the schedule;

performing, when the hybrid vehicle runs along the estimated route, a hybrid control over whether or not to drive the hybrid vehicle using the motor and whether or not to charge the battery in accordance with the schedule;

stopping performing the hybrid control based on a difference exceeding a reference degree in the estimate route between a driving situation at a present travel and a driving situation recorded in the estimated route, when the hybrid vehicle runs along the estimated route; and executing an autonomous control mode after stopping performing of the hybrid control based on the difference exceeding the reference degree, the autonomous control mode controlling to maintain the remaining quantity of the battery at the reference quantity value regardless of whether the hybrid vehicle runs along the estimated routed.

8. A computer readable medium comprising instructions being executed by a computer, the instructions including a computer-implemented method for managing a battery of a hybrid vehicle, which uses an internal combustion engine driven by fuel combustion and a motor driven by the battery as a power source for running, the instructions comprising:

performing a scheduling which (i) determines a schedule about whether or not to drive the hybrid vehicle using the motor and to charge the battery along an estimated route to a destination and (ii) estimates transition of a remaining quantity of the battery along the estimated route based on the schedule;

performing a hybrid control to control a hybrid control apparatus so as to operate in a passive control mode according to the determined schedule when the hybrid vehicle runs the estimated route, the hybrid control apparatus being configured to switch an own operation mode between the passive control mode and an autonomous control mode based on an instruction issued from the hybrid control, the passive control mode which changes whether or not to drive the hybrid vehicle by the motor and whether or not charge the battery according to an instruction issued from the hybrid control, the autonomous control mode which changes whether or not to drive the hybrid vehicle by the motor and whether or not to charge the battery independent of an instruction issued from the hybrid control; and stopping performing the hybrid control and then controlling the hybrid control apparatus so as to operate in the autonomous control mode based on an instruction issued from the hybrid control a predetermined signal indicating that the passive control mode be inappropriate, the autonomous control mode controlling to maintain the remaining quantity of the battery at the referenced quantity value regardless of whether the hybrid vehicle runs along the estimated route.

9. A computer readable medium comprising instructions being executed by a computer, the instructions for achieving all the control units included in the charge-discharge management apparatus according to claim 1.

10. A computer readable medium comprising instructions being executed by a computer, the instructions for achieving all the control units included in the charge-discharge management apparatus according to claim 2.

11. A computer readable medium comprising instructions being executed by a computer, the instructions for achieving all the control units included in the charge-discharge management apparatus according to claim 3.

12. A computer readable medium comprising instructions being executed by a computer, the instructions for achieving all the control units included in the charge-discharge management apparatus according to claim 4.

* * * * *